US012687289B2

(12) United States Patent
Umemoto

(10) Patent No.: US 12,687,289 B2
(45) Date of Patent: Jul. 21, 2026

(54) LIGHT EMITTING DEVICE

(71) Applicant: PATLITE CORPORATION, Osaka (JP)

(72) Inventor: Takaya Umemoto, Osaka (JP)

(73) Assignee: PATLITE CORPORATION, Osaka (JP)

( * ) Notice: Subject to any disclaimer, the term of this patent is extended or adjusted under 35 U.S.C. 154(b) by 282 days.

(21) Appl. No.: 18/708,011

(22) PCT Filed: Nov. 30, 2022

(86) PCT No.: PCT/JP2022/044181

§ 371 (c)(1),
(2) Date: May 7, 2024

(87) PCT Pub. No.: WO2023/145247

PCT Pub. Date: Aug. 3, 2023

(65) Prior Publication Data

US 2026/0160412 A1 Jun. 11, 2026

(30) Foreign Application Priority Data

Jan. 31, 2022 (JP) ................................ 2022-013097

(51) Int. Cl.
*F21V 31/00* (2006.01)
*F21V 15/015* (2006.01)
(Continued)

(52) U.S. Cl.
CPC ............ *F21V 31/03* (2013.01); *F21V 15/015* (2013.01); *F21W 2111/00* (2013.01)

(58) Field of Classification Search
CPC .............................. F21V 15/015; F21V 31/03
See application file for complete search history.

(56) References Cited

U.S. PATENT DOCUMENTS 9,120,059 B2 9/2015 Daimon et al.
9,120,060 B2 9/2015 Uemura et al.
(Continued)

FOREIGN PATENT DOCUMENTS

CH 711625 B1 4/2017
CN 201513866 U 6/2010
(Continued)

*Primary Examiner* — Gerald J Sufleta, II
(74) *Attorney, Agent, or Firm* — Rabin & Berdo, P.C.

(57) ABSTRACT

A light emitting device (1) includes a housing (10) in which a light emitting portion (5) is accommodated and which forms an interior space (NS), a cover (3) covering above an upper wall portion (21) of the housing (10), and a waterproof and moisture-permeable member (4). The upper wall portion (21) is formed with a communication hole (21*b*) communicating with the interior space (NS). A humidity control space (CS) to control the humidity of the interior space (NS) is formed between the cover (3) and the upper wall portion (21). The waterproof and moisture-permeable member (4) is arranged in the humidity control space (CS) and covers the communication hole (21*b*). The cover (3) includes an outer peripheral edge portion (3*a*) having a size including the upper wall portion (21) of the housing (10) in a plan view. A lower end (3*b*) of the outer peripheral edge portion (3*a*) is arranged below an upper surface (21*a*) of the upper wall portion (21). A ventilation hole (30) that opens downward such as to communicate the humidity control space (CS) with an outside is formed between the outer peripheral edge portion (3*a*) of the cover (3) and the housing (10).

8 Claims, 12 Drawing Sheets

(51) Int. Cl.
*F21V 31/03* (2006.01)
*F21W 111/00* (2006.01)

(56) References Cited

U.S. PATENT DOCUMENTS

| | | | | |
|---|---|---|---|---|
| 2014/0283691 | A1 | 9/2014 | Furuuchi | |
| 2016/0228826 | A1 | 8/2016 | Furuuchi | |
| 2018/0035558 | A1 | 2/2018 | Scagliarini et al. | |
| 2019/0178401 | A1 | 6/2019 | Zaggl et al. | |
| 2021/0345503 | A1 | 11/2021 | Kitagawa et al. | |
| 2021/0356113 | A1 | 11/2021 | Kitagawa et al. | |
| 2021/0392761 | A1 | 12/2021 | Kitagawa et al. | |
| 2021/0404627 | A1* | 12/2021 | Kitagawa | F21S 45/30 |
| 2022/0061173 | A1 | 2/2022 | Fujisawa et al. | |
| 2022/0287191 | A1 | 9/2022 | Yano et al. | |
| 2023/0354492 | A1* | 11/2023 | Deixler | F21V 31/03 |

FOREIGN PATENT DOCUMENTS

| | | | |
|---|---|---|---|
| CN | 106740586 | A | 5/2017 |
| CN | 104080305 | B | 11/2020 |
| CN | 109642682 | B | 11/2021 |
| DE | 202012104978 | U1 | 1/2013 |
| EP | 2733418 | B1 | 8/2017 |
| EP | 3171683 | B1 | 8/2019 |
| EP | 2711609 | B1 | 11/2020 |
| JP | H09-180520 | A | 7/1997 |
| JP | H10-144113 | A | 5/1998 |
| JP | 7019828 | B2 | 2/2022 |
| JP | 7075418 | B2 | 5/2022 |
| JP | 7143078 | B2 | 9/2022 |
| KR | 1020070097844 | A | 10/2007 |
| KR | 10-2016-0078391 | A | 7/2016 |
| KR | 10-2006573 | B1 | 8/2019 |
| KR | 10-2021-0070356 | A | 6/2021 |
| KR | 10-2408259 | B1 | 6/2022 |
| WO | 2015/049750 | A1 | 4/2015 |
| WO | 2021/020093 | A1 | 2/2021 |
| WO | 2021/029386 | A1 | 2/2021 |

* cited by examiner

LIGHT EMITTING DEVICE

TECHNICAL FIELD

The present invention relates to a light emitting device.

BACKGROUND ART

Patent Literature 1 discloses a rotating light as a signal indicator light. The rotating light includes a main body portion and a globe installed on the main body portion. A rotatable light emitting source is installed in the globe. The main body portion has a lower portion arranged with a mounting seat portion. The mounting seat portion is mounted to a mounting surface via a rubber sheet.

CITATION LIST

Patent Literature

Patent Literature 1: Japanese Unexamined Patent Publication No. H09-180520

SUMMARY OF INVENTION

Technical Problem

Even with this type of a substantially sealed signal indicator light, air containing moisture may be sucked into the interior through, for example, a lead-in part or the like of wiring with changes in outside air temperature and atmospheric pressure. The moisture having entered the interior can cause dew condensation in the globe.

A preferred embodiment of the present invention provides a light emitting device that can suppress the occurrence of dew condensation while suppressing the entry of foreign substances from the outside.

Solution to Problem

A preferred embodiment of the present invention provides a light emitting device including a light emitting portion, a housing, a cover, and a waterproof and moisture-permeable member. The housing has a cylindrical shape with a central axis extending vertically and forms an interior space in which the light emitting portion is accommodated. The housing includes an upper wall portion formed with a communication hole that communicates with the interior space, and a peripheral wall portion extending downward from the upper wall portion. The cover is fixed to the housing and covers above the upper wall portion of the housing. The cover forms a humidity control space to control the humidity of the interior space, between the cover and the upper wall portion of the housing. The waterproof and moisture-permeable member is arranged in the humidity control space and covers the communication hole. The cover includes an outer peripheral edge portion extending in a circumferential direction around the central axis and having a size including the upper wall portion of the housing in a plan view. The outer peripheral edge portion includes a lower end arranged below an upper surface of the upper wall portion of the housing. A ventilation hole that opens downward such as to communicate the humidity control space with an outside is formed between the outer peripheral edge portion of the cover and the housing.

According to this configuration, in order to form the humidity control space, the cover that covers above the upper wall portion of the housing has the outer peripheral edge portion having the size including the upper wall portion in a plan view, and the lower end of the outer peripheral edge portion is arranged below the upper surface of the upper wall portion. Further, the ventilation hole communicating the humidity control space with the outside is formed between the outer peripheral edge portion of the cover and the housing and opens downward. Thus, the entry of foreign substances into the humidity control space from the outside can be suppressed to protect the waterproof and moisture-permeable member, and the ventilation hole can be suppressed from being blocked by rainwater, muddy water, etc., adhering to the cover to ensure the air permeability between the humidity control space and the outside. The moisture present in the interior space of the housing moves to the upper part of the interior space as water vapor as the temperature rises, escapes to the humidity control space via the waterproof and moisture-permeable member covering the communication hole in the upper wall portion of the housing, and is further released to the outside via the ventilation hole. Thus, the moisture in the interior space can be effectively released to the outside, thereby suppressing the occurrence of dew condensation.

In a preferred embodiment, the upper surface of the upper wall portion of the housing includes an inclined portion which becomes lower as it moves away from the central axis and in which the communication hole is opened. According to this configuration, water as a foreign substance can be suppressed from remaining on the inclined portion in which the communication hole is opened.

In a preferred embodiment, the communication hole is arranged higher than the lowest position of the inclined portion. According to this configuration, the communication hole can be suppressed from being affected by water as a foreign substance.

In a preferred embodiment, the waterproof and moisture-permeable member includes a waterproof and moisture-permeable sheet having an upper surface continuing to the inclined portion at an inclination equal to the inclined portion. According to this configuration, water can be suppressed from remaining on the waterproof and moisture-permeable sheet.

In a preferred embodiment, the cover includes an upwardly convex dome-shaped cover main body and a downward annular flange extending from an outer peripheral edge portion of the cover main body. The annular flange constitutes the outer peripheral edge portion of the cover. According to this configuration, the ventilation hole that opens downward can be suitably formed between the downward annular flange constituting the outer peripheral edge portion of the cover and the housing.

In a preferred embodiment, the cover includes a plurality of fitting claws that project downward from the cover main body, are annularly arranged around the central axis, and form a circumferential gap therebetween. The fitting claws are fitted to an outer peripheral surface of an upper part of the peripheral wall portion of the housing. The ventilation hole includes a plurality of ventilation holes. The plurality of ventilation holes are formed each including the circumferential gap between the plurality of fitting claws. According to this configuration, the plurality of ventilation holes are formed each including the circumferential gap between the plurality of fitting claws projecting downward from the cover main body and fitted to the upper part of the peripheral wall portion of the housing. Thus, good air permeability can be ensured between the humidity control space and the outside while ensuring the waterproofness of the humidity control space.

In a preferred embodiment, the housing includes a plurality of ribs projecting from the upper surface of the upper wall portion. Each of the plurality of ribs is arranged between the corresponding circumferential gap and the central axis in a plan view. With respect to the angle range in the circumferential direction around the central axis, an angle range in the circumferential direction occupied by each of the plurality of ribs is set to a size including an angle range in the circumferential direction occupied by the corresponding circumferential gap. According to this configuration, the angle range in the circumferential direction occupied by each rib projecting from the upper surface of the upper wall portion of the housing is set to an angle range of the size including the angle range in the circumferential direction occupied by the corresponding circumferential gap. Thus, the waterproofness of the humidity control space can be further improved while ensuring the air permeability of the humidity control space.

In a preferred embodiment, the plurality of ribs are in contact with an inner upper surface of the cover main body. According to this configuration, the waterproofness of the humidity control space can be further improved while ensuring the air permeability of the humidity control space.

Effects of Invention

In the present invention, a light emitting device that can suppress the occurrence of dew condensation while suppressing the entry of foreign substances from the outside can be provided.

DESCRIPTION OF EMBODIMENTS

Hereinafter, a preferred embodiment having embodied the present invention will be described with reference to the drawings.

Figure 1:
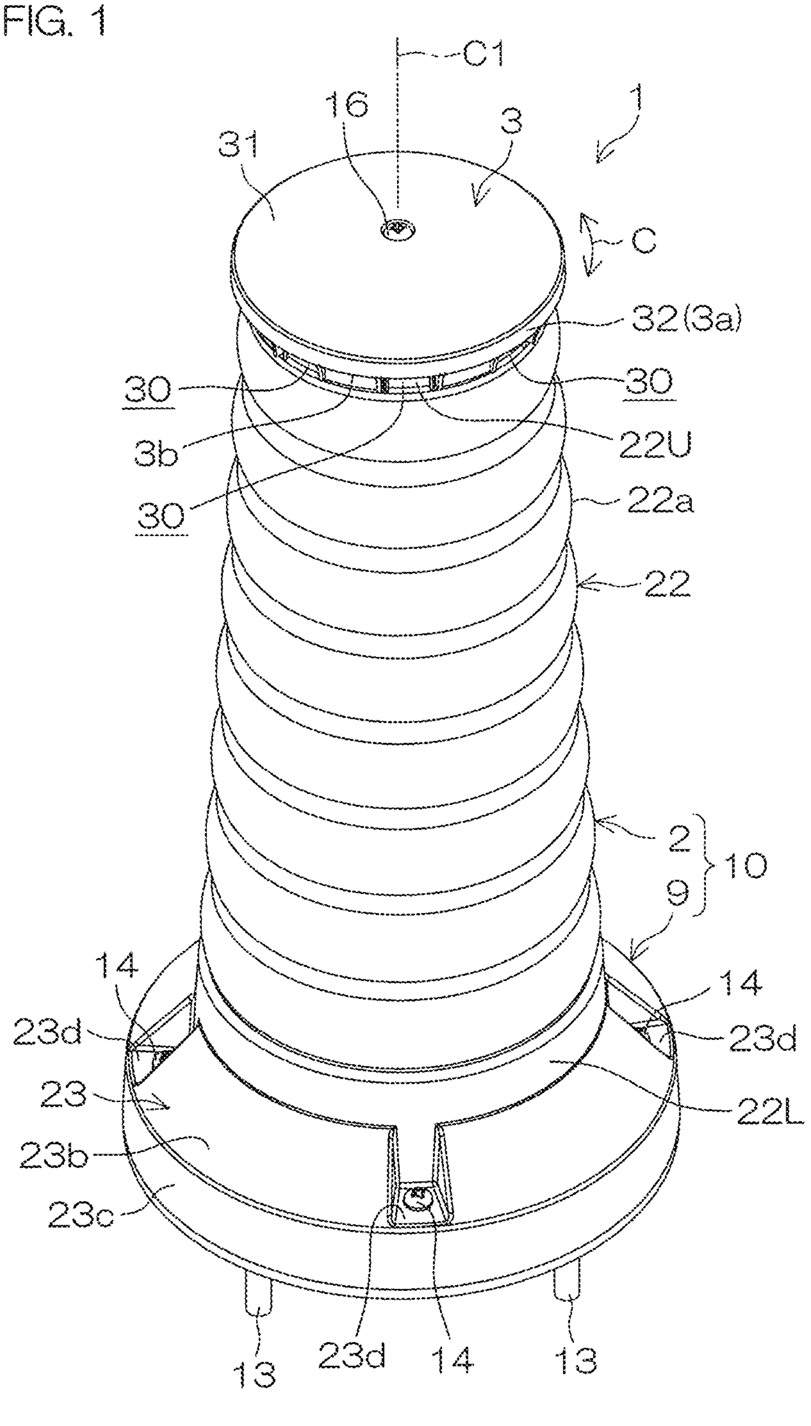
FIG. 1 is a perspective view of a light emitting device according to a preferred embodiment of the present invention.
Figure 2:
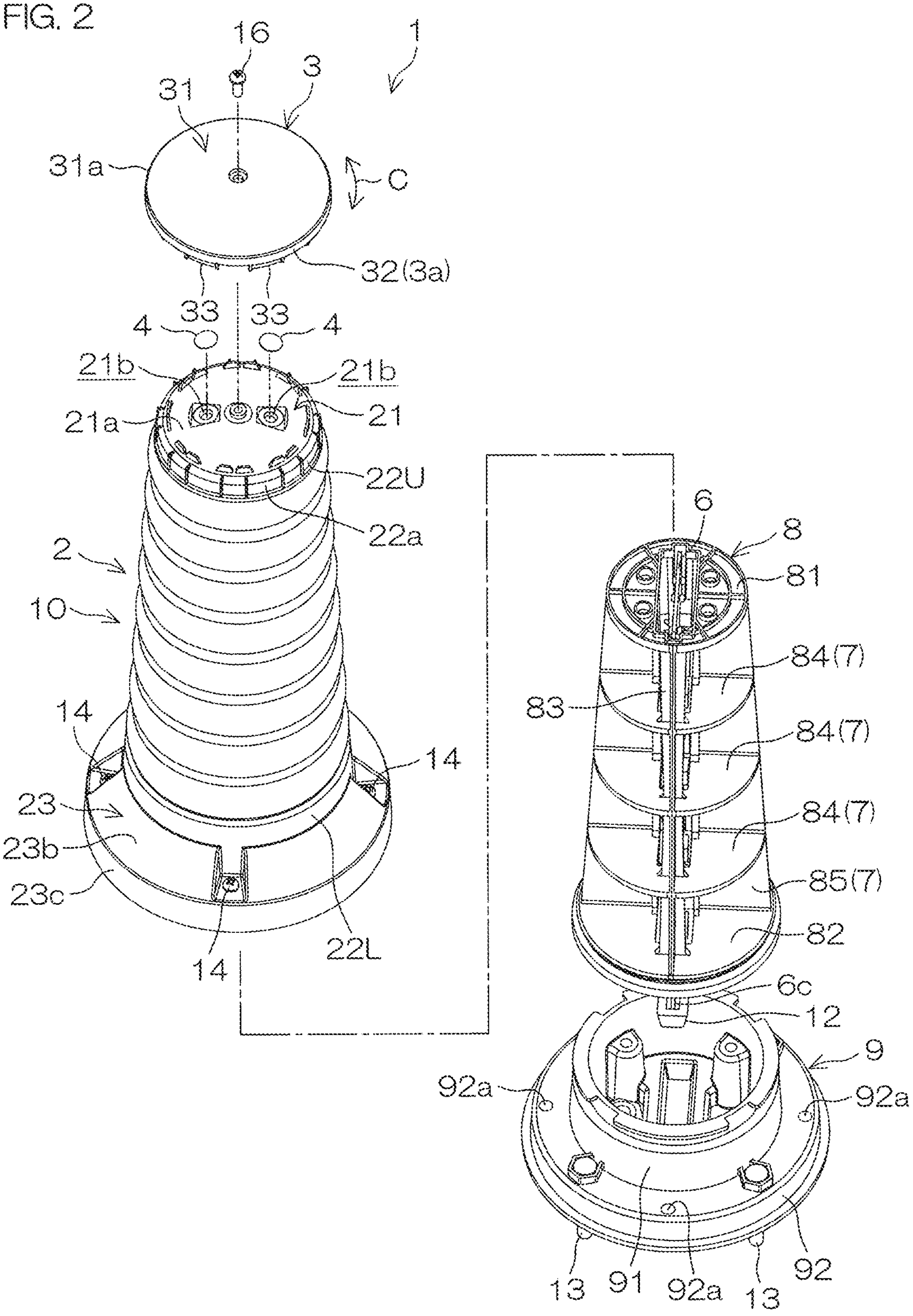
FIG. 2 is an exploded perspective view of the light emitting device.
Figure 3:
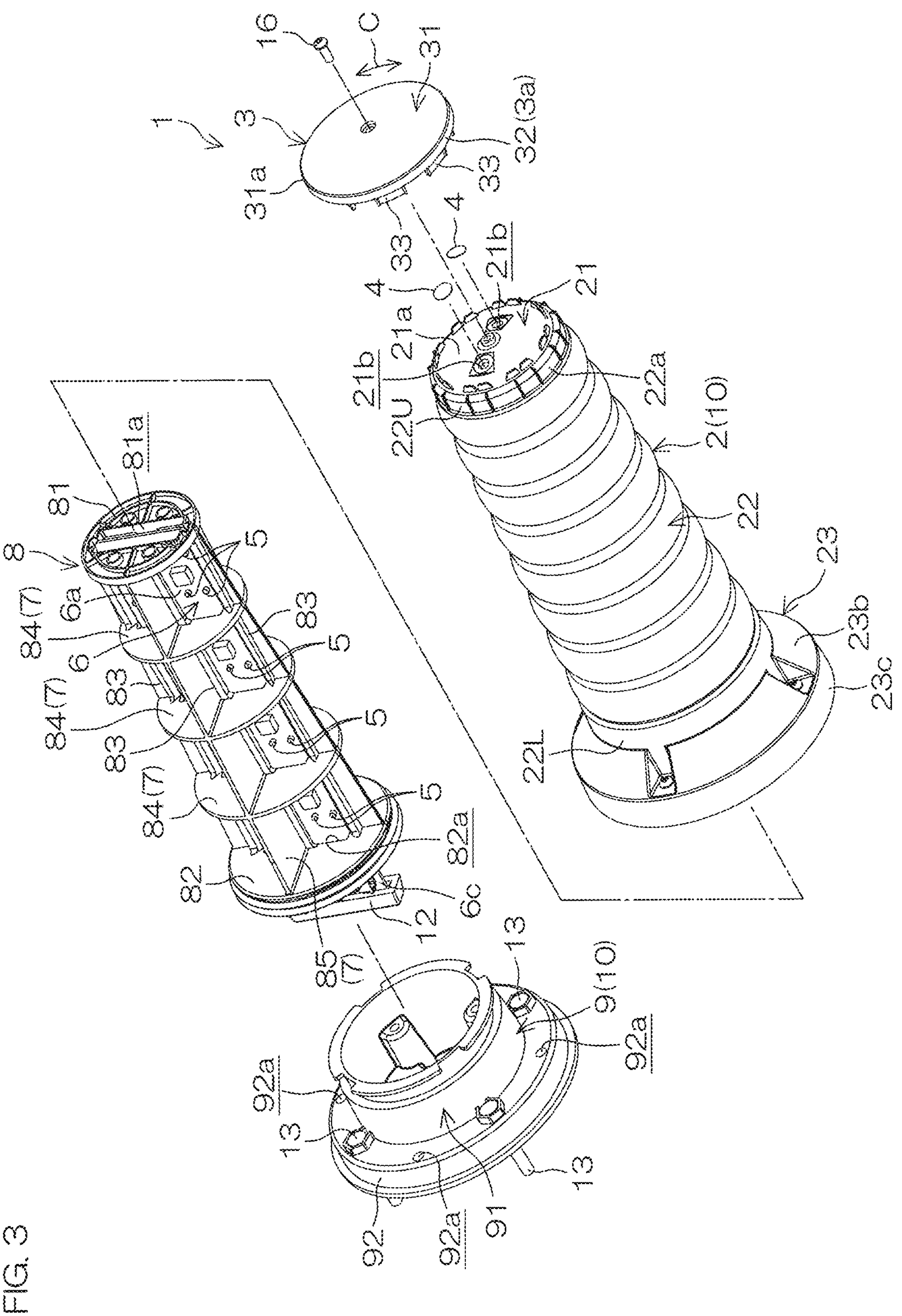
FIG. 3 is an exploded perspective view of the light emitting device from another angle.
Figure 4:
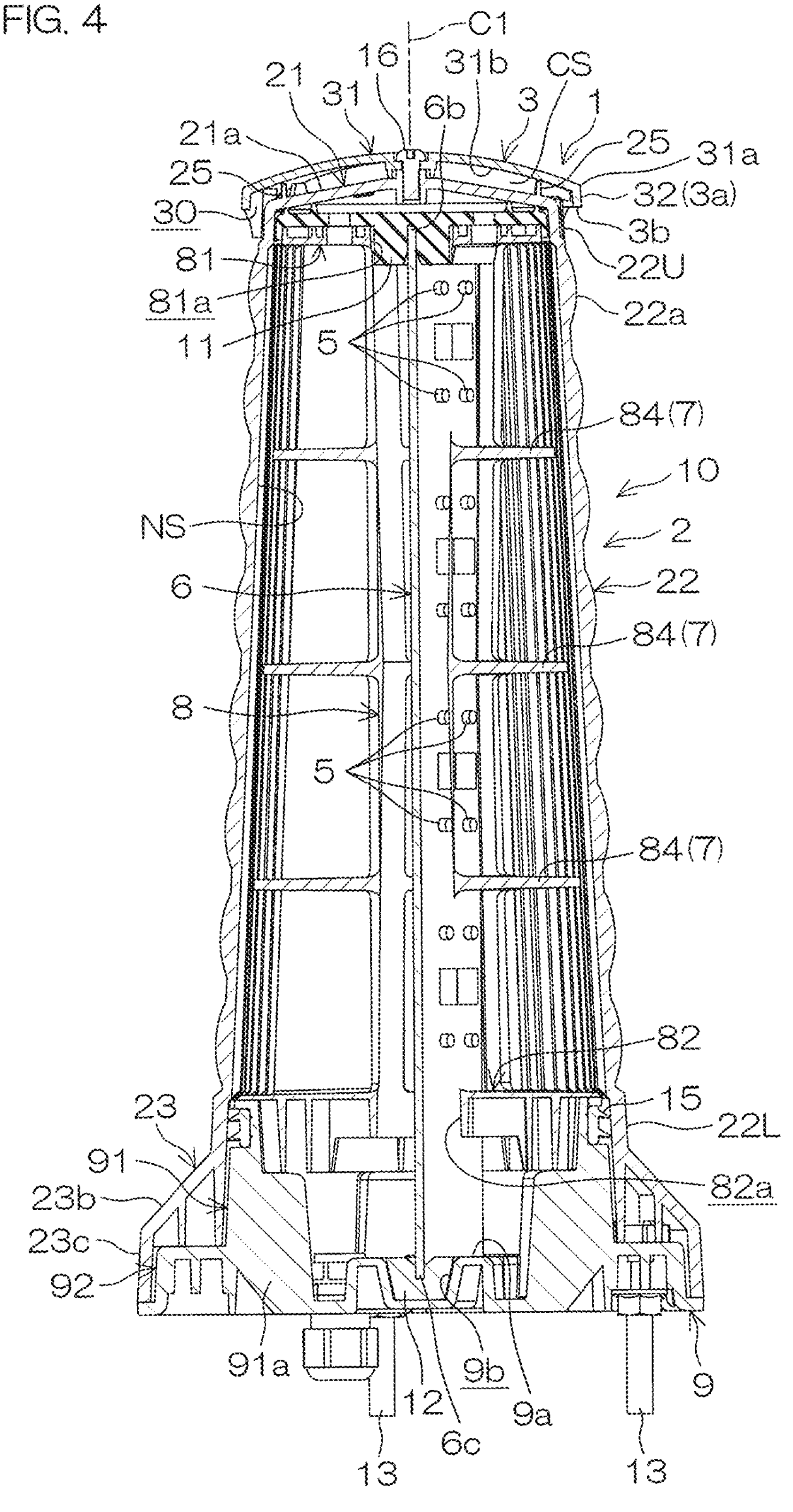
FIG. 4 is a longitudinal sectional view of the light emitting device.
Figure 5:
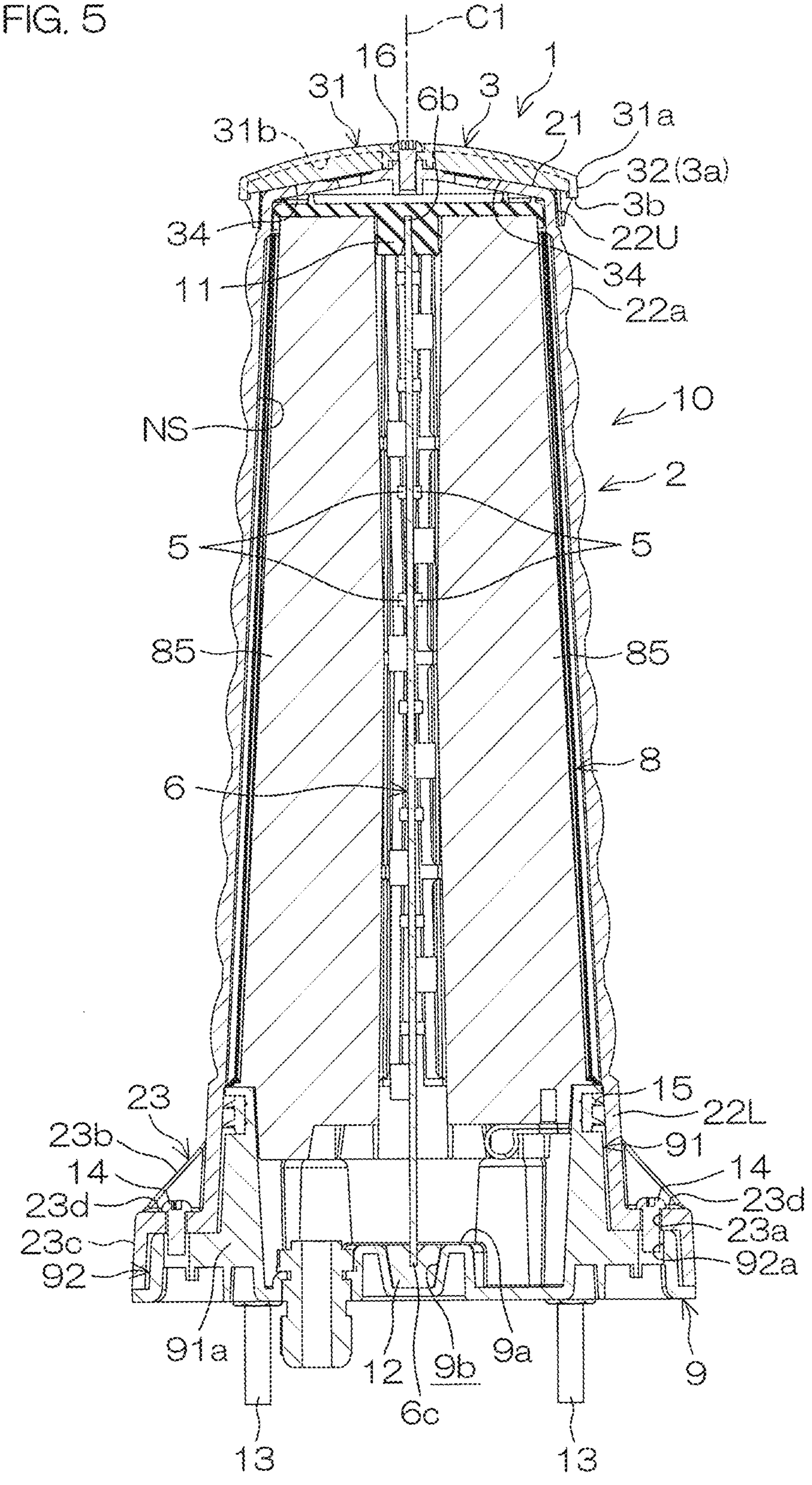
FIG. 5 is a longitudinal sectional view of the light emitting device from another angle.

FIG. 1 is a perspective view of a light emitting device according to a preferred embodiment of the present invention. FIG. 2 and FIG. 3 are exploded perspective views of the light emitting device from different angles. FIG. 4 and FIG. 5 are longitudinal sectional views of the light emitting device from different angles.

As shown in FIG. 1 to FIG. 3, a light emitting device 1 is, for example, an indicator light, and is formed in a substantially cylindrical shape with a central axis C1 extending vertically. The light emitting device 1 includes a globe 2, a cover 3, a waterproof and moisture-permeable sheet 4 (waterproof and moisture-permeable member), an LED substrate 6 on which LEDs 5 (light emitting diodes) as light emitting portions are mounted, a holder 8 with a reflector 7, and a lower case 9. The globe 2 and the lower case 9 are combined and a hollow housing 10 is formed. As shown in FIG. 4, the LED substrate 6 and the holder 8 are accommodated in an interior space NS, which is a closed space formed inside the housing 10.

Figure 8:
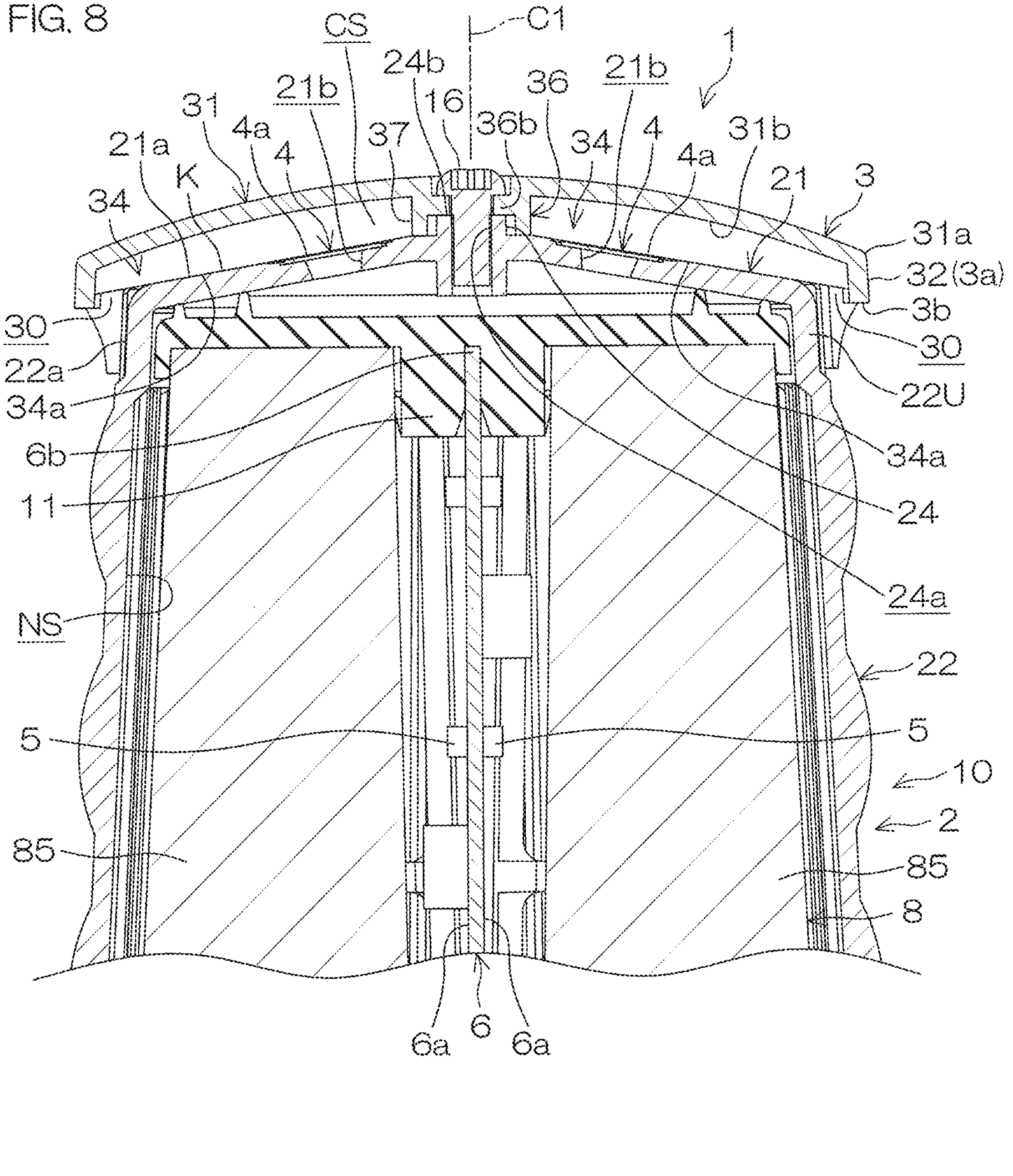
FIG. 8 is an enlarged sectional view of the upper part of the light emitting device.

As shown in FIG. 4, the cover 3 covers above an upper wall portion 21 of the globe 2. A humidity control space CS for controlling the humidity of the interior space NS is formed between the cover 3 and the upper wall portion 21 of the globe 2. As shown in FIG. 8, which is an enlarged sectional view of the upper part of the light emitting device 1, the upper wall portion 21 of the globe 2 is formed with at least one communication hole 21*b* communicating the interior space NS and the humidity control space CS. The waterproof and moisture-permeable sheet 4 is arranged in the humidity control space CS and covers the communication hole 21*b*. The waterproof and moisture-permeable sheet 4 allows moisture to pass through while blocking the permeation of water.

Figure 6:
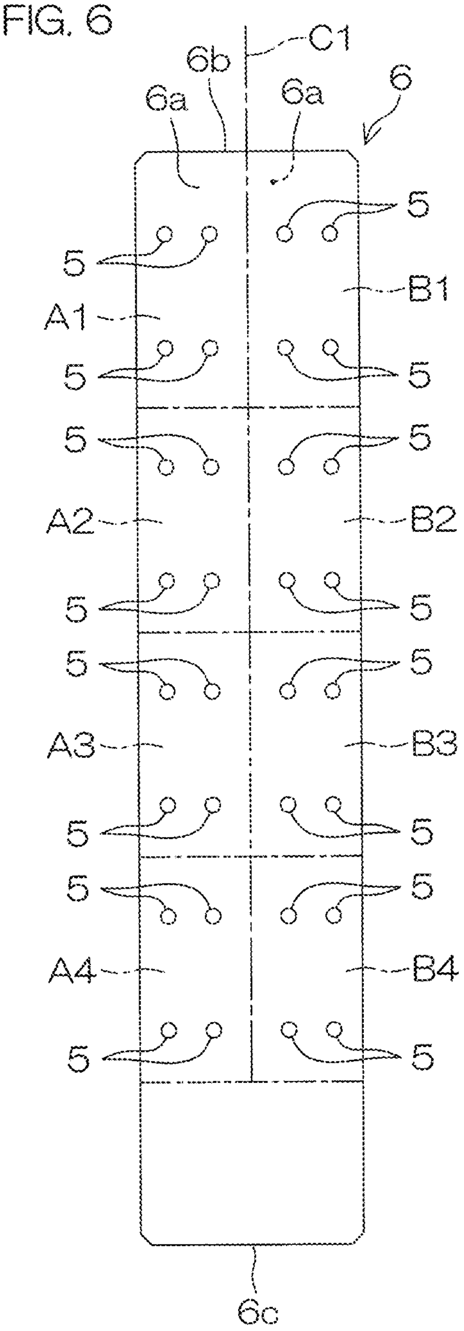
FIG. 6 is a schematic diagram of an LED substrate.

FIG. 6 is a schematic diagram of the LED substrate 6. As shown in FIG. 6, the LED substrate 6 is a vertically long rectangular plate and includes two mounting surfaces 6*a* on the front and back sides. Each of the front and back mounting surfaces 6*a* is divided into eight rectangular areas A1 to A4, B1 to B4 with four sections in the vertical direction and two sections in the horizontal direction. For example, four LEDs 5 are arranged in a rectangular shape in each of the rectangular areas A1 to A4, B1 to B4.

Next, the holder 8 will be described.

As shown in FIG. 2 to FIG. 4, the holder 8 includes an upper plate 81, a lower plate 82, and a plurality of vertical frames 83 connecting the upper plate 81 and the lower plate 82. As shown in FIG. 4, the LED substrate 6 has an upper end portion 6*b* held via a first intervening member 11, such as rubber, with respect to a peripheral edge of a rectangular holding hole 81*a* (see also FIG. 3) formed in the upper plate 81. A lower end portion 6*c* of the LED substrate 6 is inserted into a rectangular insertion hole 82*a* formed in the lower plate 82 and held via a second intervening member 12 (see also FIG. 3), such as rubber, with respect to a holding recessed portion 9*b* formed in an inner bottom portion 9*a* of the lower case 9.

The holder 8 includes a plurality of intermediate plates 84 between the upper plate 81 and the lower plate 82 and parallel thereto. Each intermediate plate 84 is circumferentially divided into four parts. The holder 8 also includes a blade plate 85 arranged orthogonal to each of the front and back mounting surfaces of the LED substrate 6 and vertically divided into four stages. The blade plate 85 connects vertically adjacent plates among the upper plate 81, the plurality of intermediate plates 84, and the lower plate 82. The surfaces of the intermediate plates 84 and the blade plate 85 function as reflectors reflecting light from the LEDS 5 toward the outside of the light emitting device 1.

Next, the lower case 9 will be described.

As shown in FIG. 2 to FIG. 4, the lower case 9 includes a bottomed cylindrical portion 91 that opens upward, and an annular flange 92 that projects outward from a bottom portion 91*a* of the cylindrical portion 91. A projecting portion of the lower plate 82 of the holder 8 is inserted and fitted to an upper part of the cylindrical portion 91 of the lower case 9. A first fixing screw 13 inserted into a screw insertion hole formed in the flange 92 of the lower case 9 is screwed into a mounting object (not shown), and the lower case 9 is fixed to the mounting object.

As shown in FIG. 5, the globe 2 is fixed to the lower case 9. The flange 92 of the lower case 9 is provided with a plurality of screw holes 92*a*. Second fixing screws 14 inserted into screw insertion holes 23*a* of an extension portion 23 of the globe 2 are screwed into the screw holes 92*a* of the flange 92 of the lower case 9, and the globe 2 is fixed to the lower case 9.

Next, the globe 2 will be described.

As shown in FIG. 2 to FIG. 4, the globe 2 is formed in a substantially cylindrical shape that opens downward. The globe 2 includes an upper wall portion 21, a peripheral wall portion 22 extending downward from the upper wall portion 21, and a cylindrical extension portion 23 extending outward from a lower part 22L of the peripheral wall portion 22. The peripheral wall portion 22 may have a cylindrical shape or may have a truncated conical shape whose diameter increases downward.

As shown in FIG. 4, the lower part 22L of the peripheral wall portion 22 of the globe 2 is fitted around an outer periphery of the cylindrical portion 91 of the lower case 9. An annular sealing member 15 is interposed between an inner periphery of the lower part 22L of the peripheral wall portion 22 of the globe 2 and the outer periphery of the cylindrical portion 91 of the lower case 9. The sealing member 15 seals between the globe 2 and the lower case 9.

A diffusion lens may be provided on an inner peripheral surface of an intermediate part between an upper part 22U and the lower part 22L of the globe 2. The diffusion lens may be formed of, for example, a large number of vertical ribs arranged at equal intervals in the circumferential direction, extending vertically, and having a semicircular cross section. Further, an outer peripheral surface of the intermediate part may be provided with a condenser lens, for example. The condenser lens may be formed of an annular stepped Fresnel lens.

The extension portion 23 includes an upper half part 23*b* and a lower half part 23*c* extending from the upper half part 23*b*. The upper half part 23*b* of the extension portion 23 has a truncated conical shape whose diameter increases downward. The lower half part 23*c* of the extension portion 23 is formed in a cylindrical shape. The lower half part 23*c* of the extension portion 23 is fitted around the outer periphery of the flange 92 of the lower case 9.

As shown in FIG. 1 and FIG. 5, the extension portion 23 includes seat surfaces 23*d* for the second fixing screws 14 fixing the globe 2 to the lower case 9. As shown in FIG. 5, in part of the extension portion 23 in the circumferential direction, stepped portion are formed to be recessed in a crank shape in a cross section. The stepped portions constitute the seat surfaces 23*d*.

Figure 7:
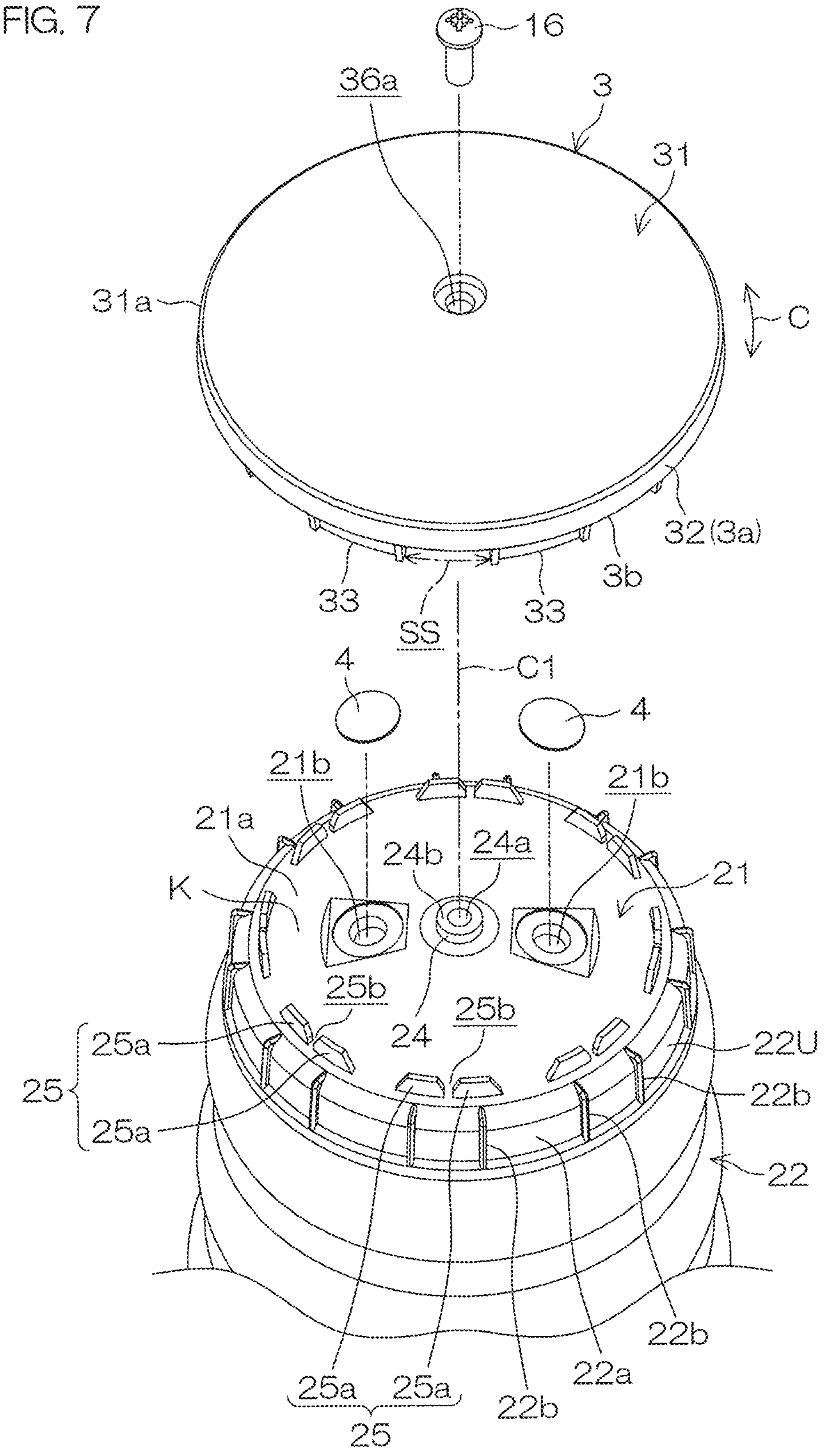
FIG. 7 is an exploded perspective view of an upper part of the light emitting device.

FIG. 7 is an exploded perspective view of the upper part of the light emitting device 1. FIG. 8 is an enlarged sectional view of the upper part of the light emitting device 1.

As shown in FIG. 7, the globe 2 includes positioning ribs 22*b* (positioning portions) formed of vertical ribs radially projecting from an outer peripheral surface 22*a* of the upper part 22U of the peripheral wall portion 22 of the globe 2. Between the positioning ribs 22*b* adjacent to each other in a circumferential direction C, the corresponding fitting claws 33 described later of the cover 3 are fitted.

As shown in FIG. 8, the upper wall portion 21 of the globe 2 has an upper surface 21*a* formed into an upwardly convex dome shape. At least part of the upper surface 21*a* of the upper wall portion 21 constitutes an inclined portion K that becomes lower as it moves away from the central axis C1.

As shown in FIG. 7, a screw boss 24 having a screw hole 24*a* is projectingly formed on the top portion of the upper wall portion 21. A third fixing screw 16 for attaching the cover 3 is screwed into the screw boss 24. The globe 2 and the cover 3 are not limited to being fixed using the screw but are sometimes fixed by means of adhesion or press fitting.

As shown in FIG. 8, at least one communication hole 21*b* is formed in the upper wall portion 21. The communication hole 21*b* penetrates the upper wall portion 21. The communication hole 21*b* communicates the interior space NS and the humidity control space CS by penetrating the upper wall portion 21. The communication hole 21*b* is arranged higher than the lowest position of the inclined portion K. The number of waterproof and moisture-permeable sheets 4 provided is the same as that of the communication holes 21*b*. The waterproof and moisture-permeable sheets 4 are arranged in the humidity control space CS and cover the corresponding communication holes 21*b*.

As shown in FIG. 7, a plurality of ribs 25 are projectingly formed on the upper surface 21*a* of the upper wall portion 21. The plurality of ribs 25 are arranged annularly around the central axis C1. The plurality of ribs 25 are arranged at equal intervals in the circumferential direction. As shown in FIG. 4, the plurality of ribs 25 are in contact with an inner upper surface 31*b* of the cover main body 31.

Each rib 25 is composed of a pair of divided ribs 25*a* divided in the circumferential direction. A radial rib 34 described later of the cover 3 is fitted to a groove 25*b* formed between the pair of divided ribs 25*a* (see FIG. 10). This enhances the connection strength of the cover 3 and the globe 2.

Next, the cover 3 will be described.

Figure 9:
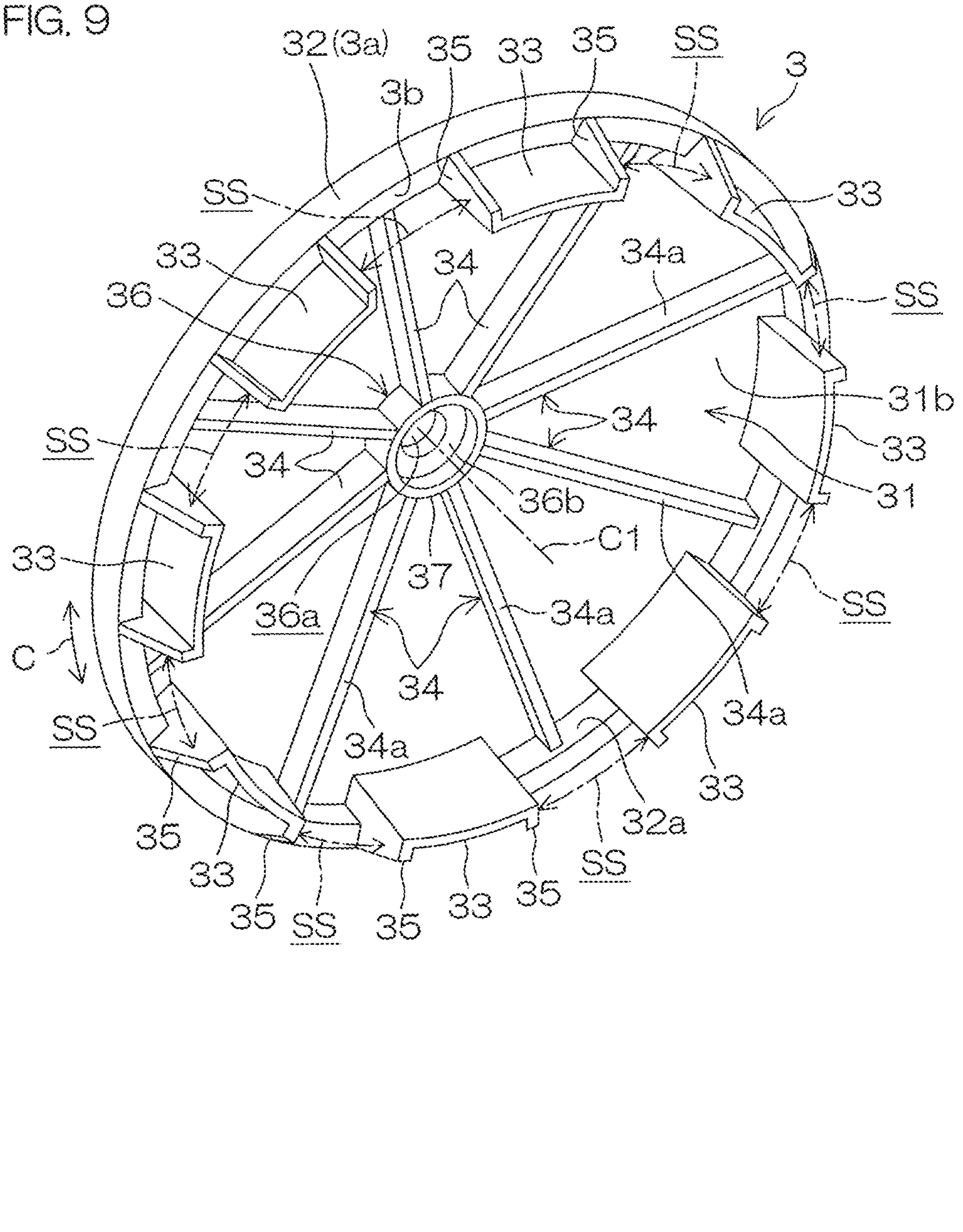
FIG. 9 is a perspective view of a cover viewed from below.
Figure 10:
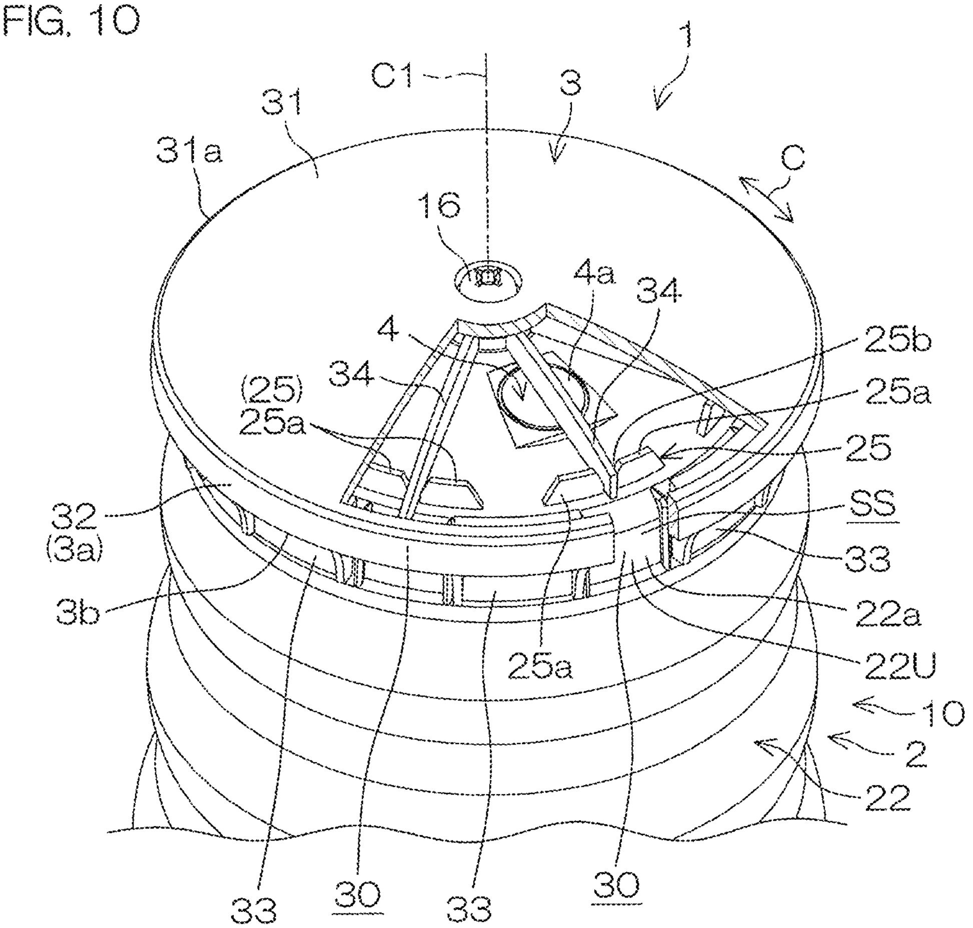
FIG. 10 is a partially cutaway perspective view of the upper part of the light emitting device.
Figure 11:
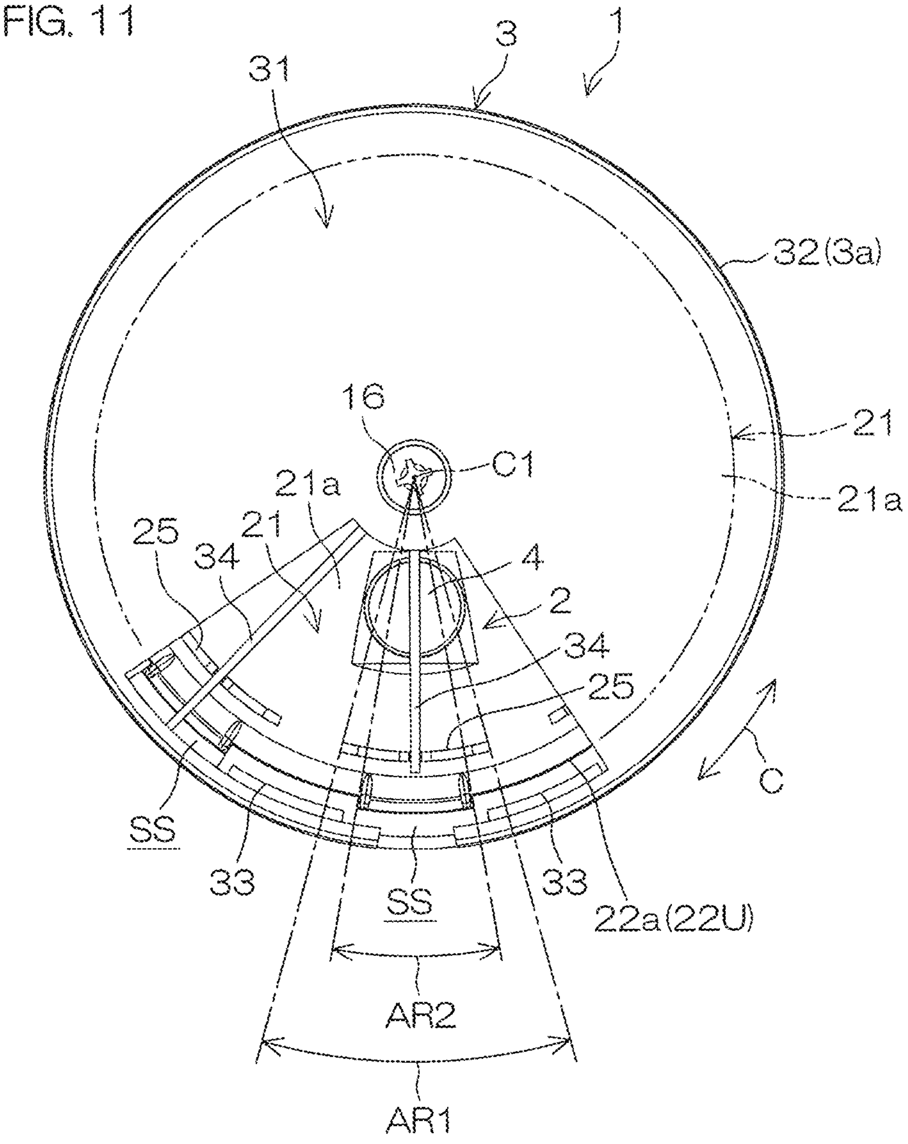
FIG. 11 is a partially cutaway plan view of the upper part of the light emitting device.

FIG. 9 is a perspective view of the cover 3 viewed from below. FIG. 10 is a partially cutaway perspective view of the upper part of the light emitting device 1. FIG. 11 is a partially cutaway plan view of the upper part of the light emitting device 1.

The cover 3 has a disk shape in a plan view. The cover 3 includes an outer peripheral edge portion 3*a* extending in the circumferential direction around the central axis C1. The outer peripheral edge portion 3*a* of the cover 3 has a size including the upper wall portion 21 of the globe 2 (corresponding to the upper wall portion of the housing 10) in a plan view (see FIG. 11). The outer peripheral edge portion 3*a* has a lower end 3*b* arranged below the upper surface 21*a* of the upper wall portion 21 of the globe 2. A ventilation hole 30 that opens downward such as to communicate the humidity control space CS with an outside is formed between the outer peripheral edge portion 3*a* of the cover 3 and the housing 10.

As shown in FIG. 8 and FIG. 9, the cover 3 includes the cover main body 31, an annular flange 32, a plurality of fitting claws 33, and a plurality of radial ribs 34. The cover main body 31 has an upwardly convex dome shape. The annular flange 32 is a downward flange extending from the outer peripheral edge portion 31*a* of the cover main body 31. The annular flange 32 constitutes the outer peripheral edge portion 3*a* of the cover 3.

As shown in FIG. 9, the plurality of fitting claws 33 project downward from the cover main body 31 and are annularly arranged around the central axis C1. The plurality of fitting claws 33 form a circumferential gap SS therebetween. The fitting claw 33 is fitted into the outer peripheral surface 22*a* of the upper part 22U of the peripheral wall portion 22 of the globe 2 (corresponding to the peripheral wall portion of the housing 10). The plurality of ventilation holes 30 are formed each including the circumferential gap SS between the plurality of fitting claws 33. Sides of the fitting claw 33 abut against the positioning ribs 22*b* (see FIG. 7) of the upper part 22U of the peripheral wall portion 22 of the globe 2, whereby the cover 3 is positioned in the circumferential direction C with respect to the globe 2.

As shown in FIG. 9, the fitting claws 33 are arc-shaped claws arranged along an inner peripheral surface 32*a* of the annular flange 32 of the cover 3 and projecting below the lower end of the annular flange 32. A reinforcing rib 35 connected to the annular flange 32 is formed on a pair of sides in the circumferential direction C of the fitting claw 33. The reinforcing ribs 35 may not be provided.

As shown in FIG. 11, each of the plurality of ribs is arranged between a corresponding one of the circumferential gaps SS between the plurality of fitting claws 33 of the cover 3 and the central axis C1. With respect to the angle range in the circumferential direction C around the central axis C1, an angle range AR1 in the circumferential direction C occupied by each of the plurality of ribs 25 is set to a size including an angle range AR2 in the circumferential direction C occupied by the corresponding circumferential gap SS.

The cover 3 includes a boss 36 extending along the central axis C1 and having a screw insertion hole 36*a* formed therein. The boss 36 of the cover 3 has a bottom portion 36*b* received by an upper end surface 24*b* of the screw boss 24 of the globe 2. The third fixing screw 16 inserted into the screw insertion hole 36*a* (see FIG. 7) of the boss 36 of the cover 3 is screwed into the screw hole 24*a* of the screw boss 24 of the globe 2.

The cover 3 includes an annular projection 37 projecting downward from an outer peripheral edge of the bottom portion 36*b* of the boss 36. The annular projection 37 has an annular shape centered on the central axis C1. A lower end of the annular projection 37 is in contact with the upper surface 21*a* of the upper wall portion 21 of the globe 2 while surrounding the screw boss 24 of the upper wall portion 21 of the globe 2. This enhances the waterproofness.

As shown in FIG. 9, the plurality of radial ribs 34 radially extend around the central axis C1. The radial rib 34 extends from the boss 36 to the annular flange 32. A lower end 34*a* of the radial rib 34 is inclined such as to be along the upper surface 21*a* of the upper wall portion 21 of the globe 2. As shown in FIG. 10, some of the radial ribs 34 suppress the waterproof and moisture-permeable sheets 4 from floating from the peripheral edges of the communication holes 21*b* by longitudinally crossing on upper surfaces 4*a* of the waterproof and moisture-permeable sheets 4.

The waterproof and moisture-permeable sheet 4 has a property that does not allow liquid (moisture) to pass through but allows air (gas) to pass through. The waterproof and moisture-permeable sheet 4 includes a hydrophobic porous resin material. Foamed PTFE (polytetrafluoroethylene) is suitably used as the hydrophobic porous resin material. For example, Gore-Tex (registered trademark) may be used as the waterproof and moisture-permeable sheet 4.

As shown in FIG. 8, the upper surface 4*a* of the waterproof and moisture-permeable sheet 4 continues to the inclined portion K of the upper surface 21*a* of the upper wall portion 21 of the globe 2 at the same inclination as the inclined portion K.

According to this preferred embodiment, in order to form the humidity control space CS, the cover 3 covering above the upper wall portion of the housing 10 (the upper wall portion 21 of the globe 2) has the outer peripheral edge portion 3*a* (see FIG. 11) having a size including the upper wall portion 21 in a plan view. As shown in FIG. 8, the lower end 3*b* of the outer peripheral edge portion 3*a* is arranged below the upper surface 21*a* of the upper wall portion 21. The ventilation hole 30 communicating the humidity control space CS with the outside is formed between the outer peripheral edge portion 3*a* of the cover 3 and the housing 10 and opens downward. Accordingly, the entry of foreign substances (birds and animals, rainwater, muddy water, washing water, etc.) into the humidity control space CS from the outside can be suppressed, and the waterproof and moisture-permeable sheet 4 can be protected from the foreign substances. Further, since the ventilation hole 30 opens downward, even if rainwater or muddy water adheres to the outer surface of the cover 3, the ventilation hole 30 can be suppressed from being blocked by the rainwater or muddy water, and the air permeability between the humidity control space CS and the outside can be ensured. Even if liquid moisture enters the humidity control space CS, the entry of the liquid moisture into the interior space NS can be suppressed by the waterproof and moisture-permeable sheet 4.

The moisture present in the interior space NS of the housing 10 moves to the upper part of the interior space NS as water vapor as the temperature rises, escapes to the humidity control space CS via the waterproof and moisture-permeable sheet 4 covering the communication hole 21*b* of the upper wall portion 21, and is further released to the outside via the ventilation hole 30. Thus, the moisture in the interior space NS can be effectively released to the outside, thereby suppressing the occurrence of dew condensation.

Further, the upper surface 21*a* of the upper wall portion 21 includes the inclined portion K that becomes lower as it moves away from the central axis C1, and the communication hole 21*b* is opened in the inclined portion K. Thus, water as a foreign substance can be suppressed from remaining on the inclined portion K in which the communication hole 21*b* is opened.

Further, the communication hole 21*b* is arranged higher than the lowest position of the inclined portion K. Thus, the communication hole 21*b* and the waterproof and moisture-permeable sheet 4 covering the communication hole 21*b* can be suppressed from being affected by water as a foreign substance.

Further, the waterproof and moisture-permeable sheet 4 as the waterproof and moisture-permeable member includes the upper surface 4*a* continuing to the inclined portion K at the same inclination as the inclined portion K. Thus, water can be suppressed from remaining on the waterproof and moisture-permeable sheet 4.

Further, the cover 3 includes the upwardly convex dome-shaped cover main body 31 and the downward annular flange 32 extending from the outer peripheral edge portion 31*a* of the cover main body 31, and the annular flange 32 constitutes the outer peripheral edge portion 3*a* of the cover 3. Thus, the ventilation hole 30 that opens downward can be suitably formed between the downward annular flange 32 constituting the outer peripheral edge portion 3*a* of the cover 3 and the globe 2 (the housing 10).

Further, as shown in FIG. 9, the cover 3 includes the plurality of fitting claws 33 projecting downward from the cover main body 31 and forming the circumferential gap SS therebetween. As shown in FIG. 11, the fitting claw 33 is fitted to the outer peripheral surface 22*a* of the upper part 22U of the peripheral wall portion 22 of the globe 2 (the peripheral wall portion of the housing 10). The plurality of ventilation holes 30 are formed each including the circumferential gap SS between the plurality of fitting claws 33 fitted to the upper part 22U of the peripheral wall portion 22. Thus, good air permeability can be ensured between the humidity control space CS and the outside while ensuring the waterproofness of the humidity control space CS.

Further, as shown in FIG. 10 and FIG. 11, the globe 2 (the housing 10) includes the plurality of ribs 25 projecting from the upper surface 21*a* of the upper wall portion 21. In a plan view, each of the plurality of ribs 25 is arranged between the corresponding circumferential gap SS and the central axis C1. As shown in FIG. 11, with respect to the angle range in the circumferential direction C around the central axis C1, the angle range AR1 in the circumferential direction C occupied by each of the plurality of ribs 25 is set to the size including the angle range AR2 in the circumferential direction C occupied by the corresponding circumferential gap SS. Thus, the waterproofness of the humidity control space CS can be further improved while ensuring the air permeability of the humidity control space CS. It is noted that the communication hole 21*b* is preferably arranged higher than the ribs 25 contributing to the waterproofing in the inclined portion K.

Further, as shown in FIG. 4, the plurality of ribs 25 are in contact with the inner upper surface 31*b* of the cover main body 31. Thus, the waterproofness of the humidity control space CS can be further improved while ensuring the air permeability of the humidity control space CS.

The present invention is not limited to the above preferred embodiment, and the present invention can be applied to light emitting devices including signal lights, indicator lights, various types of lighting devices used in outdoor environments or environments equivalent to the outdoors. As the positioning portions for positioning the cover 3 in the circumferential direction C with respect to the globe 2, stepped portions formed on the outer peripheral surface of the peripheral wall portion 22 of the globe 2 may be used instead of the positioning ribs 22*b*.

Figure 12:
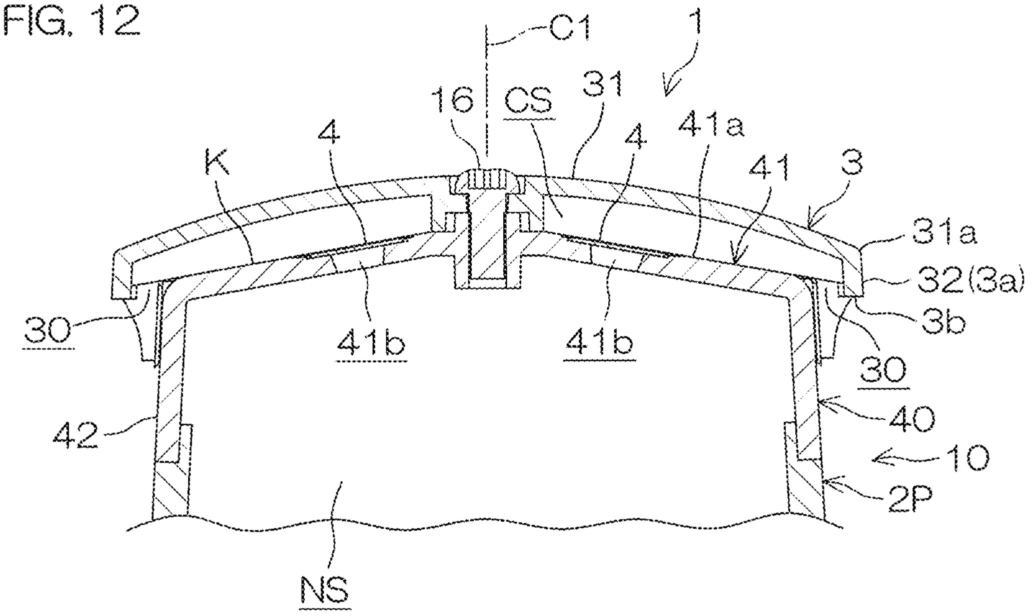
FIG. 12 is a schematic sectional view of an upper part of a light emitting device in a modification.

Further, as shown in FIG. 12, which is a schematic sectional view, a housing 10 in a modification of the light emitting device 1 may include a cylindrical globe 2P that opens upward, and an outer top 40 air-tightly coupled (for example, screw-fitted) to the globe 2P such as to close the upper part of the globe 2P. The outer top 40 includes an upper wall portion 41, an upper surface 41*a*, a communication hole 41*b*, and a peripheral wall portion 42 respectively corresponding to the upper wall portion 21, the upper surface 21*a*, the communication hole 21*b*, and the upper part 22U of the peripheral wall portion 22 of the preferred embodiment shown in FIG. 8.

Other than the above, various modifications can be made to the present invention within the scope of the claims.

REFERENCE SIGNS LIST

- 1: Light emitting device
- 2; 2P: Globe
- 3: Cover
- 3*a*: Outer peripheral edge portion
- 3*b*: Lower end
- 4: Waterproof and moisture-permeable sheet (Waterproof and moisture-permeable member)
- 4*a*: Upper surface
- 5: LED (light emitting portion)
- 9: Lower case
- 10: Housing
- 21: Upper wall portion
- 21*a*: Upper surface
- 21*b*: Communication hole
- 22: Peripheral wall portion
- 22*a*: Outer peripheral surface
- 30: Ventilation hole
- 31: Cover main body
- 31*a*: Outer peripheral edge portion
- 31*b*: Inner upper surface
- 32: Annular flange
- 40: Outer top
- 41: Upper wall portion
- 41*a*: Upper surface
- 42: Peripheral wall portion
- AR1: Angle range
- AR2: Angle range
- C: Circumferential direction
- C1: Central axis
- CS: Humidity control space
- K: Inclined portion
- NS: Interior space
- SS: Circumferential gap

The invention claimed is:

1. A light emitting device comprising:

a light emitting portion;

a housing having a cylindrical shape with a central axis extending vertically and forming an interior space in which the light emitting portion is accommodated, the housing including an upper wall portion formed with a communication hole that communicates with the interior space, and a peripheral wall portion extending downward from the upper wall portion;

a cover fixed to the housing and covering above the upper wall portion of the housing, the cover forming a humidity control space to control humidity of the interior space between the cover and the upper wall portion of the housing; and a waterproof and moisture-permeable member arranged in the humidity control space and covering the communication hole, wherein the cover includes an outer peripheral edge portion extending in a circumferential direction around the central axis and having a size including the upper wall portion of the housing in a plan view, and the outer peripheral edge portion includes a lower end arranged below an upper surface of the upper wall portion of the housing, and a ventilation hole that opens downward such as to communicate the humidity control space with an outside is formed between the outer peripheral edge portion of the cover and the housing.

2. The light emitting device according to claim 1, wherein the upper surface of the upper wall portion of the housing includes an inclined portion which becomes lower as it moves away from the central axis and in which the communication hole is opened.

3. The light emitting device according to claim 2, wherein the communication hole is arranged higher than a lowest position of the inclined portion.

4. The light emitting device according to claim 2, wherein the waterproof and moisture-permeable member includes a waterproof and moisture-permeable sheet having an upper surface continuing to the inclined portion at an inclination equal to the inclined portion.

5. The light emitting device according to claim 1, wherein the cover includes an upwardly convex dome-shaped cover main body and a downward annular flange extending from an outer peripheral edge portion of the cover main body, and the annular flange constitutes the outer peripheral edge portion of the cover.

6. The light emitting device according to claim 5, wherein the cover includes a plurality of fitting claws that project downward from the cover main body, are annularly arranged around the central axis, and form a circumferential gap therebetween, the plurality of fitting claws fitted to an outer peripheral surface of an upper part of the peripheral wall portion of the housing, and the ventilation hole includes a plurality of ventilation holes, and the plurality of ventilation holes are formed each including the circumferential gap between the plurality of fitting claws.

7. The light emitting device according to claim 6, wherein the housing includes a plurality of ribs projecting from the upper surface of the upper wall portion, each of the plurality of ribs is arranged between the corresponding circumferential gap and the central axis in a plan view, and with respect to an angle range in the circumferential direction around the central axis, an angle range in the circumferential direction occupied by each of the plurality of ribs is set to a size including an angle range in the circumferential direction occupied by the corresponding circumferential gap.

8. The light emitting device according to claim 7, wherein the plurality of ribs are in contact with an inner upper surface of the cover main body.

* * * * *